United States Patent [19]

Rapp et al.

[11] 4,317,723
[45] Mar. 2, 1982

[54] SEWAGE TREATMENT

[75] Inventors: Walter W. Rapp; Gary A. Crosby, both of New Iberia, La.

[73] Assignee: Red Fox Industries Inc., New Iberia, La.

[21] Appl. No.: 151,405

[22] Filed: May 19, 1980

Related U.S. Application Data

[63] Continuation-in-part of Ser. No. 95,107, Nov. 16, 1979, Pat. No. 4,268,389.

[51] Int. Cl.³ ............................ C02F 3/20; C02F 3/22
[52] U.S. Cl. .................................... 210/202; 210/218; 210/220; 210/256; 210/261
[58] Field of Search .................... 210/138, 170, 195.1, 210/195.3, 195.4, 197, 202, 218, 220, 221.1, 256, 261; 261/120

[56] References Cited

U.S. PATENT DOCUMENTS

| | | | |
|---|---|---|---|
| Re. 26,931 | 7/1970 | Valdespino | 210/261 X |
| 1,642,206 | 9/1927 | Imhoff | 210/221.1 X |
| 2,413,838 | 1/1947 | Mallory | 210/221.1 X |
| 2,709,680 | 5/1955 | Watson | 210/138 X |
| 2,769,546 | 11/1956 | Fontein | 210/197 X |
| 2,901,114 | 8/1959 | Smith et al. | 210/256 X |
| 3,220,706 | 11/1965 | Valdespino | 210/221.1 X |
| 3,271,304 | 9/1966 | Valdespino et al. | 210/197 X |
| 3,285,422 | 11/1966 | Wiley | 210/512.1 |
| 3,298,526 | 1/1967 | Valdespino et al. | 210/197 X |
| 3,335,865 | 8/1967 | Cawley et al. | 210/195.3 X |
| 3,336,016 | 8/1967 | Schreiber | 261/DIG. 75 |
| 3,347,784 | 10/1967 | Kappe | 210/197 X |
| 3,397,789 | 8/1968 | Valdespino | 210/195.3 X |
| 3,415,381 | 12/1968 | Thayer | 210/195.3 X |
| 3,419,146 | 12/1968 | Koulovatos | 210/195.3 X |
| 3,497,064 | 2/1970 | Valdespino | 210/256 X |
| 3,535,234 | 10/1970 | Gilwood | 210/195.3 X |
| 3,552,725 | 1/1971 | Ray | 261/120 X |
| 3,744,634 | 7/1973 | Schlenz | 210/197 X |
| 3,753,897 | 8/1973 | Lin et al. | 210/197 X |
| 3,764,011 | 10/1973 | Owens | 210/197 X |
| 3,819,053 | 6/1974 | Milotich | 210/512.1 X |
| 3,837,493 | 9/1974 | Lin | 210/197 |
| 3,850,801 | 11/1974 | Pearson | 210/197 X |
| 3,879,285 | 4/1975 | Yost | 210/170 X |
| 3,910,838 | 10/1975 | Kaelin | 210/197 X |
| 3,992,299 | 11/1976 | Wray | 210/195.3 X |
| 3,997,437 | 12/1976 | Prince et al. | 210/195.3 X |
| 4,231,874 | 11/1980 | Heiligtag | 261/DIG. 75 |

Primary Examiner—Robert H. Spitzer
Attorney, Agent, or Firm—Wilkinson, Mawhinney & Theibault

[57] ABSTRACT

The present disclosure is directed to a sewage treatment device of the marine type and operates on an extended aeration principle employing an aerator, clarifier and disinfector. The clarifier is disposed beneath the aerator and the top of the clarifier with a common wall therebetween which forms the bottom of the aerator. A first passage conducts fluid from the aerator to the clarifier and has a central port in the common wall. A second passage conducts fluid from the clarifier to the disinfector. The aerator has an influent inlet and the disinfector has an effluent outlet.

The treator includes in the aerator vessel nozzle means for admitting air to the vessel in a direction to cause fluid in the vessel to move orbitally about a vertical axis with the nozzle means being disposed at a level proximate the common wall between the aerator and clarifier. The treater also includes a device arranged in a vertical stack of cylindrical components in which the uppermost is an aeration chamber, a clarification chamber beneath the aeration chamber and in communication therewith. A clarifier discharge chamber lies beneath the aeration and clarification chambers, a chlorine contact discharge chamber is connected to the clarifier discharge chamber. There is means communicating the clarification chamber with the clarifier discharge chamber, and an anti-siphon vent means is in communication between the clarification chamber and the chlorine contact discharge chamber and lies substantially in the geometric center of the aeration chamber.

8 Claims, 14 Drawing Figures

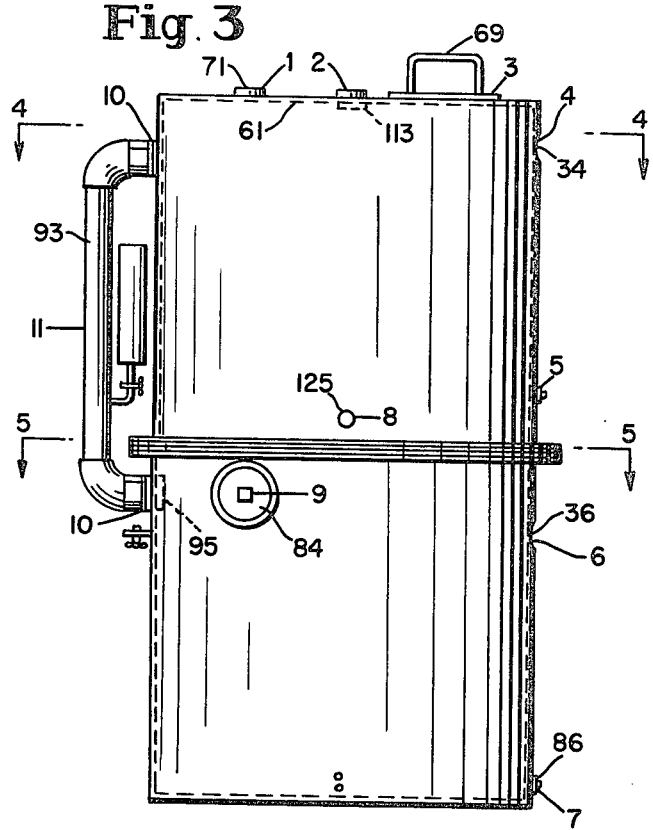
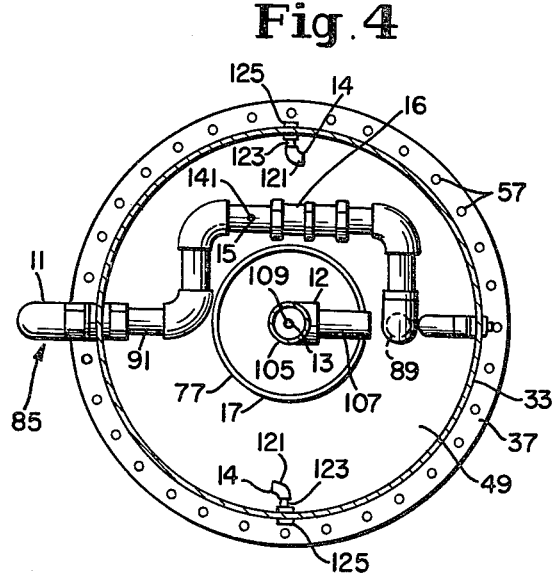
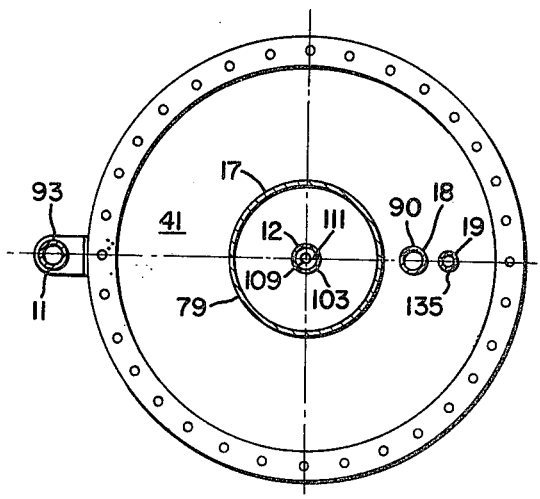

Fig. 6

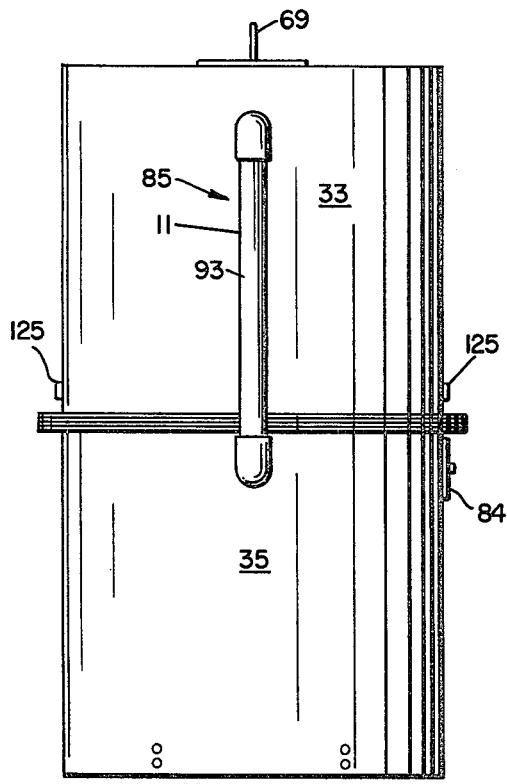

Fig. 7

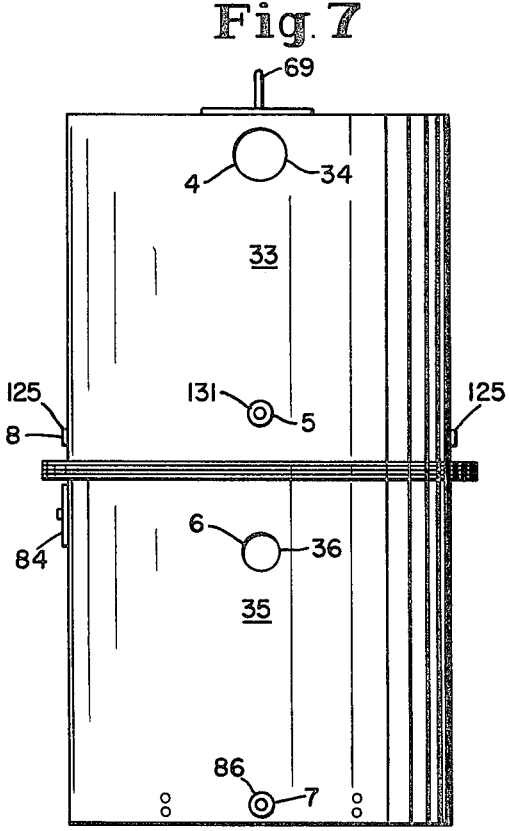

Fig. 8
BILL OF MATERIALS

| REF. NO. | NO. REQ'D | DESCRIPTION |
|---|---|---|
| 1 | | AIR VENT - 2" N.P.T. |
| 2 | | SLUDGE RETURN - 2" N.P.T. |
| 3 | | ACCESS HATCH |
| 4 | | 3" INLET |
| 5 | | 1" DRAIN N.P.T. W/PLUG |
| 6 | | 2" DISCHARGE |
| 7 | | 1" DRAIN N.P.T. W/PLUG |
| 8 | 2 | 1/2" N.P.T. |
| 9 | | INSPECTION AND FLUSHING CONNECTION - 4" N.P.T. W/PLUG |
| 10 | | CROSSOVER MANIFOLD - 2" N.P.T. |
| 11 | | CROSSOVER MANIFOLD |
| 12 | | SLUDGE RETURN |
| 13 | | AIR LINE - 1/2" PIPE |
| 14 | | DIFFUSER JET |
| 15 | | ANTISYPHON AND FILLING VENT - 1/2" PIPE |
| 16 | | 2" COMPRESSION COUPLING |
| 17 | | CLARIFIER BAFFLE - 12" PIPE |
| 18 | | 2" N.P.T. |
| 19 | | 1" DRAIN N.P.T. |
| 20 | | CLARIFIER TOP PLATE |
| 22 | | ALTERNATE CONNECTION FOR DISINFECTANT |

SEWAGE TREATMENT

This application is a continuation-in-part of our similarly entitled application Ser. No. 095,107, filed Nov. 16, 1979, now U.S. Pat. No. 4,268,389, granted May 19, 1981.

BACKGROUND OF THE INVENTION

This invention relates to sewage treatment and more particularly to method and apparatus for treatment of sewage on board ship employing the extended aeration principle.

Some examples of prior art devices for the treatment of sewage are disclosed in U.S. Pat. Nos:
- U.S. Pat. No. 2,709,680—Watson (marine)
- U.S. Pat. No. 2,901,114—Smith et al. (concentric)
- U.S. Pat. No. 3,497,064—Valdespino (nested cone and cylinder)
- U.S. Pat. No. 3,552,725—Ray (rotor)

The Smith patent represents an effort to reduce treater size. The various chambers, however, are all of different diameters requiring a large inventory of parts. The air diffuser is said to create a rolling motion of the sewage in the aerator and to cause the contents of the stabilizer to rotate prior to discharge of the sludge therein back to the aerator. It does not appear that the motion imparted to the sewage in the Smith et al. treater is other than to increase air-solids contact.

The rotor of the Ray treater appears to be for the purpose of enhancing air circulation above a sewage pond.

The Valdespino treater includes an aerator disposed at a distance from a nested clarifier and chlorinator, with all three units having different diameters.

The Watson treater includes a power driven mechanical rotary agitator having blades to agitate the sewage. However, no aerator is included, merely subsequent stages of chemical treatment.

Other sewage treaters are discussed in the copending applications hereinafter mentioned and in the patents cited relative thereto.

Difficulties with prior treaters include cost, required variety of factory inventory, and size. An object of the present invention is to overcome these difficulties and still provide a highly efficient treater suitable for use on shipboard where the treater is subject to repeated changes of inclination.

SUMMARY OF THE INVENTION

According to the invention a treater comprises two mug-shaped cylindrical vessels or modules disposed lip to lip with a flat disc having its outer periphery of lip captured between the vessel lips separating the mugs to form a clarification chamber in the lower upright vessel and an aeration chamber in the upper inverted vessel. A truncated cone-shaped cup is nested in the lower vessel to form a chlorination chamber therebetween, the cup lip also being captured between the vessel lips, all four lips being bolted together. Tangential nozzles at the bottom of the aeration chamber cause centrifugal separation as well as maceration and enhanced bacterial reduction of sewage. Low density solid suspensions discharge from the aeration chamber through a central port surrounded by a cylindrical baffle rising above the air nozzle level to help guide aerator fluid into a circular motion. Fine solid suspension fluid passing through the central port at the bottom of the aeration chamber into the clarification chamber is guided to the bottom of the chamber by a skirt baffle depending from the periphery of the central port, leaving the top of the clarification chamber in a quiescent state. Liquid flows from the clarification chamber to the chlorination chamber through a standpipe in the aeration chamber, a crossover pipe in the aeration chamber (which has an antisiphon vent to the aeration chamber) and an external downcomer diametrically opposite from the standpipe with respect to the cylinder axis of the treater. A sludge return line extends concentrically from near the bottom of the clarification chamber to the upper part of the aeration chamber and discharges near a sewage inlet at the top of the aeration chamber. An airlift pipe extends concentrically through the sludge return line. A sodium hypochlorite tank outside the aerator feeds by gravity through an adjustable needle-valve into the downcomer or directly into the side of the chlorination compartment. Chlorinated effluent discharges from the treater by overflowing through a port in the lower vessel near the top of the chlorination chamber. Suitable ports are provided for initially venting the chlorination compartment, for continuously venting the aeration chamber, and for cleaning out the treater, the guide baffle in the aeration chamber being slotted to allow complete drainage.

BRIEF DESCRIPTION OF THE DRAWINGS

For a detailed description of a preferred embodiment of the invention reference will be made to the accompanying drawings wherein:

FIG. 3 is a left-side elevation of the treater (considering the right-hand side of the treater as seen in FIG. 1 to be the front);

FIGS. 4 and 5 are horizontal sections taken on the planes indicated in FIG. 3;

FIG. 6 is a rear view of the treater;

FIG. 7 is a front view of the treater;

FIG. 8 is a bill of materials for the treater;

DESCRIPTION OF PREFERRED EMBODIMENT

Modular Vessels

Figure 1:
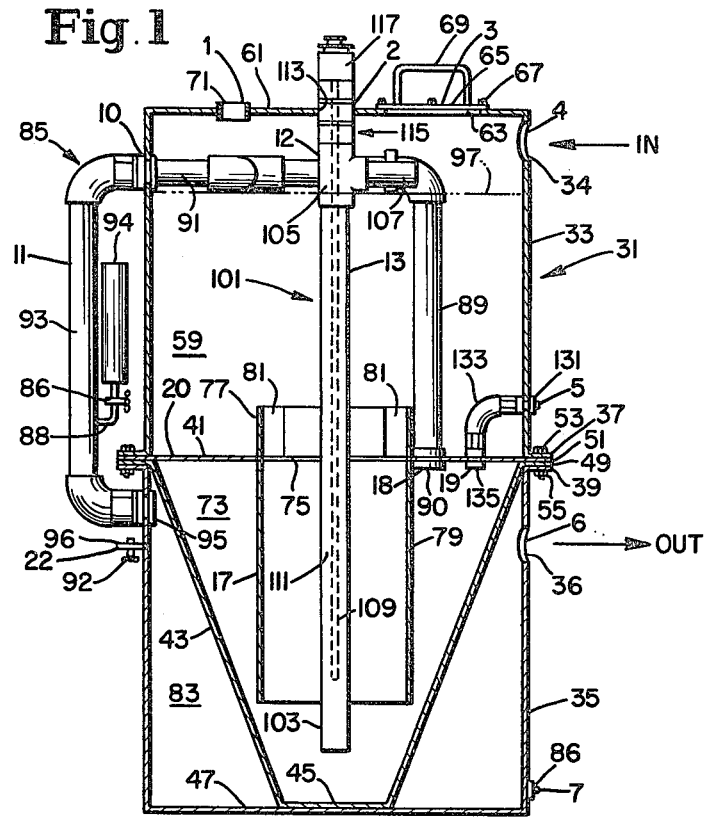
FIG. 1 is an axial vertical section through a treater embodying the invention.

Referring now especially to FIG. 1, and also to other Figures as the context requires, there is shown a sewage treater 31. The treater is of generally cylindrical configuration and includes two similar cylindrical mug-shaped vessels or modules 33, 35. Vessels 33, 35, respectively, inverted and upright, are disposed lip to lip. Ports 34, 36 in vessels 33, 35, respectively, provide an inlet and an outlet to the treater. Ports 34, 36 are to be connected respectively to influent and effluent pipes (not shown).

Flanged Connection

The vessels have outturned radial flanges 37, 39 at their respective lips. A flat circular plate or disc 41 is disposed between the two vessels with its outer periphery between the flanges on the vessels. A truncated conical cup 43 is disposed in the lower or upright vessel 35 with the flat bottom 45 of the cup resting on the flat bottom 47 of the upright vessel. The cup has an outturned radial flange 49 at its upper edge or lip resting on lip flange 39 of the upright vessel. The outer periphery 51 of disc 41 is the same size and shape as flanges 37, 39, and 41 and may be viewed as a flange at the perimeter of the disc. Disc flange 51 rests on the top of cup lip flange 49, and inverted vessel lip 37 rests on flange 51. The four flanges are secured together by fastening means comprising a plurality of bolts 53 and nuts 55, the bolts extending through circumferentially spaced apart holes 57 (FIG. 2) in flange 37 and registering holes in flanges 39, 49, 51.

Aerator

Vessel 33 and disc 41 form an aeration chamber 59. In the flat plate 61 at the top of the aeration chamber (FIG. 2) there is a rectangular access opening 63 which is closed by a rectangular cover plate 65 releasably secured to top plate 61 by a plurality of cap screws 67. Cover 65 has a handle bar 69 welded thereto. The aeration chamber is continuously vented of excess air and other gas such as carbon dioxide via port 71 in plate 61. Normally port 71 will be connected to a vent pipe (not shown) conducting the vented gas to a remote location.

Clarifier and its Connection to Aerator

Cup 43 and disc 41 form clarification chamber 73. Central port 75 in disc 41 connects the aeration chamber 59 with clarification chamber 73. Circular guide 77 extending upwardly from disc 41 around port 75 and circular skirt 79 extending downwardly from disc 41 around port 75 provide baffle means restricting communication between the aeration chamber to the axial or central portions thereof. Preferably guide 77 is discontinuous, there being e.g. three vertical slots or openings 81 therein equally circumferentially spaced apart, whereby the aeration chamber can be completely drained when desired.

Chlorinator and its Connection to Clarifier

Vessel 35 and cup 43 form a chlorination chamber or chlorinator 83. An inspection and flushing port in the upper part of the chlorinator is closed by screw plug 84 (FIG. 3). A drain port in the side of the chlorinator near the bottom plate 47 is closed by screw plug 86.

Chlorination contact chamber 83 is connected to clarification chamber or clarifier 73 by conduit 85 which extends in part through aeration chamber or aerator 59. Conduit 85 includes standpipe 89 connected at its lower end to a port 90 in disc 41 located radially outwardly from port 75 and skirt 79. Conduit 85 further includes a horizontal crossover piping 91 which connects the top of standpipe 89 with the top of a downcomer 93 outside of vessels 33 and 35, the downcomer being connected to a port 95 in the side of vessel 35. Port 95 is diametrically opposite from port 90.

It will be seen that the height of standpipe 89, or more precisely the height of the bottom of the interior of crossover piping 91, determines the maximum liquid level 97 in aerator 59.

When the liquid level exceeds the height of the bottom of the interior of piping 91, liquid from the clarifier will overflow standpipe 89 and flow via crossover 91 into downcomer 93 and then flow into chlorination contact chamber 83. Liquid thus withdrawn from the clarifier will be replaced with liquid from the aerator through port 75 in disc 41.

A tank 94 connects to the side of downcomer 93 in the lower part thereof through a manually adjustable needle valve 86 and pipe 88. Sodium hypochlorite (bleach) or other disinfectant in tank 94 is fed by gravity from tank 94 through downcomer 93 into the chlorinator at a rate determined by the settling of the needle valve. Alternatively, pipe 88 can be connected directly to the chlorinator through inlet pipe 96 controlled by valve 92. Chlorination contact chamber 83 provides the contact time for disinfection.

Sludge Return Line

Clarifier 73 is connected to aerator 59 by sludge return line 101. Line 101 includes a lift pipe 103 passing axially through port 75 and extending downwardly coaxially of vessel 35, cup 43 and skirt 79 to a level below skirt 79, about four inches off the bottom of cup 43 is the exemplary embodiment shown. Pipe 103 extends upwardly to a tee 105 which connects to a side outlet 107 discharging above liquid level 97. Lift air is introduced near the bottom of lift pipe 103 by means of tube 109. Tube 109 is concentric with pipe 103 and has a smaller outer diameter than the inner diameter of pipe 103, leaving an annular flow passage 111 therebetween. Tube 109 extends upwardly through tee 105 and thence through a port 113 in treater top plate 61 sealed by bulkhead packer 115. Exteriorly of the treater, tube 111 connects to coupling 117 which is to be connected to a source of air under pressure (not shown).

It will be seen that air admitted to annulus 111 from tube 109 will lower the density of the fluid (air-liquid-solids mixture) in annulus 111 compared to the density of the fluid outside of pipe 103, causing the fluid in the annulus to rise and discharge above the liquid level in the aerator. In this manner heavy sludge collecting in the bottom of the clarifier will be drawn into pipe 103 and returned to the aerator to mix with the influent entering at port 34. It will be noted from FIG. 4 that crossover piping 91 curves or bends around the top of the aerator in order to get around the sludge return line 101 from standpipe 90 to downcomer 93 diametrically opposite therefrom.

Aeration

Figure 2:
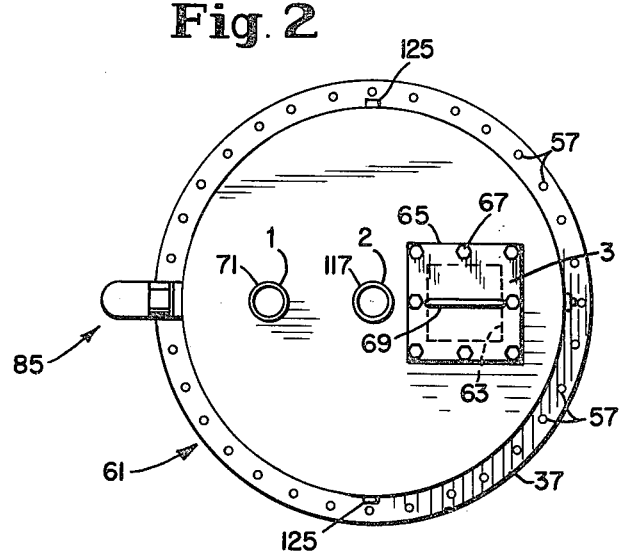
FIG. 2 is a top view of the treater.

Air under a slight pressure of e.g. 3–5 psi, i.e. sufficient to overcome the liquid head of the treater and operate the airlift of the sludge return line, is admitted to the aeration chamber through two nozzles 121 (FIG. 4) located near the bottom of the aerator and close to the outer periphery thereof. The nozzles are connected to air inlet pipes 123 which pass through ports in the side of vessel 33, the pipes being sealed to the vessel by bulkhead seals 125. As shown in FIGS. 2, 4 and 6, the two nozzles 121 are 180 degrees apart about the cylinder axis of the aeration chamber. However, fewer or additional nozzles may be employed. Preferably, there are employed a plurality of nozzles equally spaced apart about the aerator axis.

The nozzles are disposed with their exit axes directed tangentially, i.e. perpendicular to radii drawn from the axis of the aerator to the nozzles. With this disposition, the air leaving the nozzles is in the form of tangential jets which cause the material in the aerator to travel in a circular path about the aerator axis. Since the jets are below the level of the top of guide 77, the guide helps the jets create the circular motion of the liquid in the aerator.

The circular motion of the fluid (suspension of solids in an air-water mixture) in the aerator will cause the denser material to move to the outer part of the aerator and the less dense material to move to the axial center of the aerator. In other words, there will be a centrifugal separation. When fluid flows from the aerator to the clarifier, it will be less dense, more thoroughly macerated digested fluid which will first leave the aerator. Meanwhile, the denser, less thoroughly macerated and digested material will remain in the aerator at the outer part thereof which friction with the wall of vessel 33 may cause some turbulence and assist in maceration, aeration, and digestion thereof.

General Operation

To operate the treater, the aerator and clarifier are first filled with water through inlet 34 to a level above the bottom of crossover piping 91 in the aerator. The port closed by plug 131 is connected by pipe 133 with a port 135 in disc 41. Any air trapped in the top of the clarifier during the filling of the treater with water will be vented through pipe 133 and then when the water level reaches the top of guide 77 water will emerge via pipe 133, indicating that water in the treater has reached the minimum level for startup. Preferably, further water is admitted until water emerges from discharge port 36 in the clarifier.

Sewage can then be admitted to the treater via inlet port 34. Influent at port 34 will normally be intermittent. The sewage will mix with the water in the bottom of the aerator. Treating air will be admitted to the material in the aerator via nozzles 121 at a rate compatible with the expected average rate of flow of incoming sewage, in an amount sufficient to macerate the solids and cause bacterial aerobic digestion thereof to reduce the sewage to a fine suspension.

When the level of sewage in the aerator reaches the highest level of the bottom of crossover piping 91, water, at first, and the clarified water after the treater has been in operation awhile, will flow up standpipe 89 from the clarifier, through crossover piping 91 and then via downcomer 93 into the chlorinator.

Meanwhile needle valve 86 will have been opened to admit disinfectant (sodium hypochlorite) to the chlorinator from tank 94 at a rate sufficient to reduce the bacteria count in the effluent to a desired level.

DESCRIPTION OF MODIFIED EMBODIMENT

Referring now especially to FIGS. 9 through 14, and also to other Figures as the context requires, there is shown a sewage treater 231. The treater is of generally cylindrical configuration and includes geometrically similar cylindrical mug-shaped vessels of modules 233 and 235 with two cylindrical sections in between, 226 and 227, inverted and upright. Ports 134 and 136 in vessels 233, 235, respectively, provide an inlet and an outlet to the treater. Ports 134, 136 are to be connected respectively to influent and effluent pipes (not shown for influent).

Flanged Connection

Figure 10:
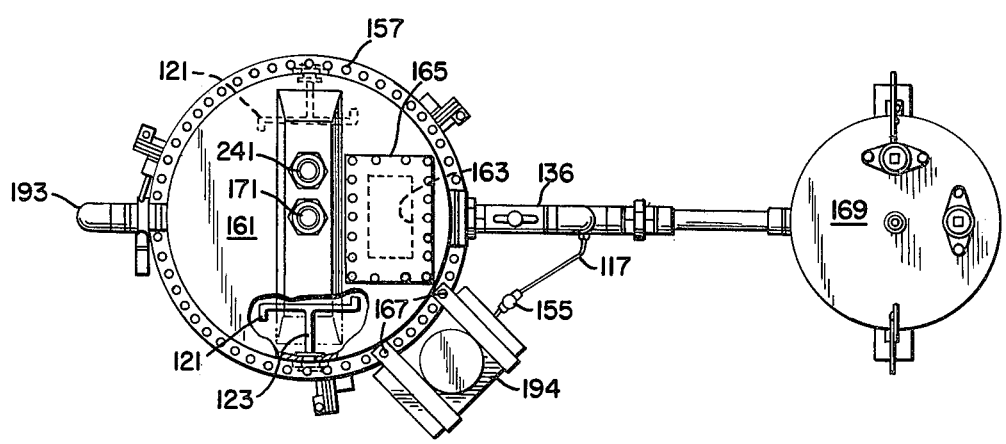
FIG. 10 is a vertical sectional view of the device of FIG. 9 taken on the line 10—10 in FIG. 9.
Figure 11:
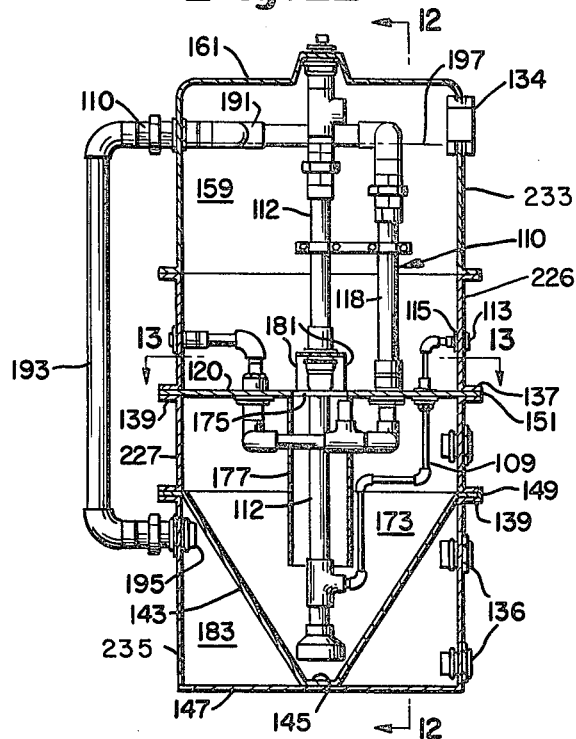
FIG. 11 is a side elevational view of the device of FIG. 9.

The vessels have outturned radial flanges 137 at their respective lips. A flat circular plate or disc 120 is disposed between the two vessels with its outer periphery between the flanges on the vessels. A truncated conical cup 143 is disposed in the lower or upright vessel 235 with the flat bottom 145 of the cup resting on the flat bottom 147 of the upright vessel. The cup has an outturned radial flange 149 at its upper edge or lip resting on lip flange 139 of the upright vessel. The outer periphery of disc 120 is the same size and shape as flanges 137 and 139 and may be viewed as a flange at the perimeter of the disc. Disc flange 151 rests on the top of upper clarifier cylindrical section lip flange 139, and lower aeration chamber cylindrical section lip 137 rests on flange 151. All flanges are secured together by fastening means comprising a plurality of bolts and nuts, the bolts extending through circumferentially spaced apart holes 157 (FIG. 10).

Aerator

Vessel 233 and disc 120 form an aeration chamber 159. In the flat plate 161 at the top of the aeration chamber (FIG. 10) there is a rectangular access opening 163 which is closed by a rectangular cover plate 165 releasably secured to top plate 161 by a plurality of studs and wing nuts 167. The aeration chamber is continuously vented of excess air and other gas such as carbon dioxide via port 171 in plate 161. Normally port 171 will be connected to a vent pipe (not shown) conducting the vented gas to a remote location.

Clarifier and its Connection to Aerator

Cup 143, disc 120 and upper clarifier cylindrical section 227 form clarification chamber 173. Central port 175 in disc 120 connects the aeration chamber 159 with clarification chamber 173. Cylindrical guide 177 extending upwardly from disc 120 around port 175 provides baffle means restricting communication between the aeration chamber to the axial or central portions thereof. Preferably guide 177 is discontinuous, there being e.g. two vertical side openings 181 therein equally circumferentially spaced apart, whereby the aeration chamber can be completely drained when desired.

Clarifier Discharge Chamber and its Connection to Clarifier

Figure 9:
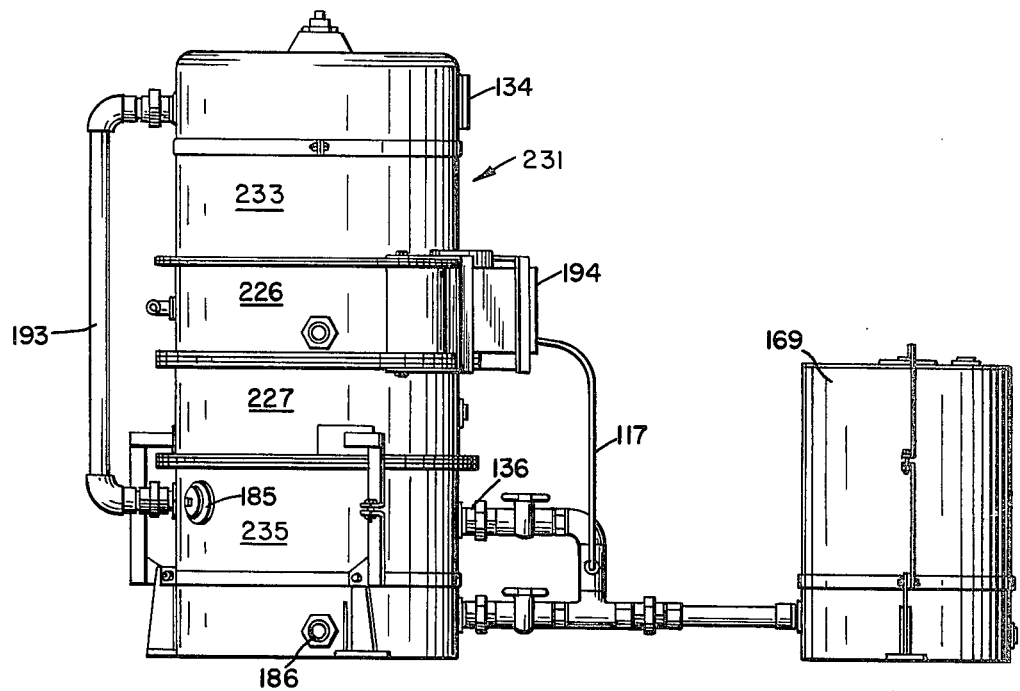
FIG. 9 is a vertical sectional view taken through a modified embodiment of the invention.

Vessel 135 and cup 143 form a clarifier discharge chamber 183. An inspection and flushing port in the upper part of the clarifier discharge chamber is closed by screw plug 185 (FIG. 9). A drain port in the side of the clarification discharge chamber near the bottom plate 147 is closed by screw plug 186.

Clarifier discharge chamber 183 is connected to clarification chamber or clarifier 173 by conduit 110 which extends in part through aeration chamber or aerator 159. Conduit 110 includes standpipe 118 connected at its lower end to a port in disc 120 located radially outwardly from port 175 and skirt 177. Conduit 110 further includes a horizontal crossover piping 191 which connects the top of standpipe 118 with the top of a downcomer 193 outside of vessels 233 and 235, the downcomer being connected to a port 195 in the side of vessel 235.

It will be seen that the height of standpipe 118, or more precisely the height of the bottom of the interior of crossover piping 191, determines the maximum liquid level 197 in aerator 159.

When the liquid level exceeds the height of the bottom of the interior of piping 191, liquid from the clarifier will overflow standpipe 118 and flow via crossover 191 into downcomer 193 and then flow into clarifier discharge chamber 183. Liquid thus withdrawn from the clarifier will be replaced with liquid from the aerator flowing through port 175 in disc 120.

Sludge Return Line

Clarifier 173 is connected to aerator 159 by sludge return line 112. Line 112 passes axially through port 175 and extending downwardly coaxially of vessel 135 and 153 cup 143 and skirt 177 to a level below skirt 177, about one inch off the bottom of cup 143 in the embodiment shown. Pipe 112 extends upwardly to a tee which discharges above liquid level 197. Lift air is introduced near the bottom of lift pipe 112 by means of tube 109. Tube 109 extends upwardly through disc 120 and thence through a port 113 in aeration chamber lower cylindrical section 226 sealed by bulkhead packer 115. Exteriorly of the treater, tube 109 connects to a source of air under pressure from blower 250, FIG. 14.

It will be seen that air admitted to line 112 from tube 109 will lower the density of the fluid (air-liquid-solids mixture) in line 112 compared to the density of the fluid outside of pipe 112, causing the fluid in the pipe 112 to rise and discharge above the liquid level in the aerator. In this manner heavy sludge collecting in the bottom of the clarifier will be drawn into pipe 112 and returned to the aerator to mix with the influent entering at port 134.

Figure 14:
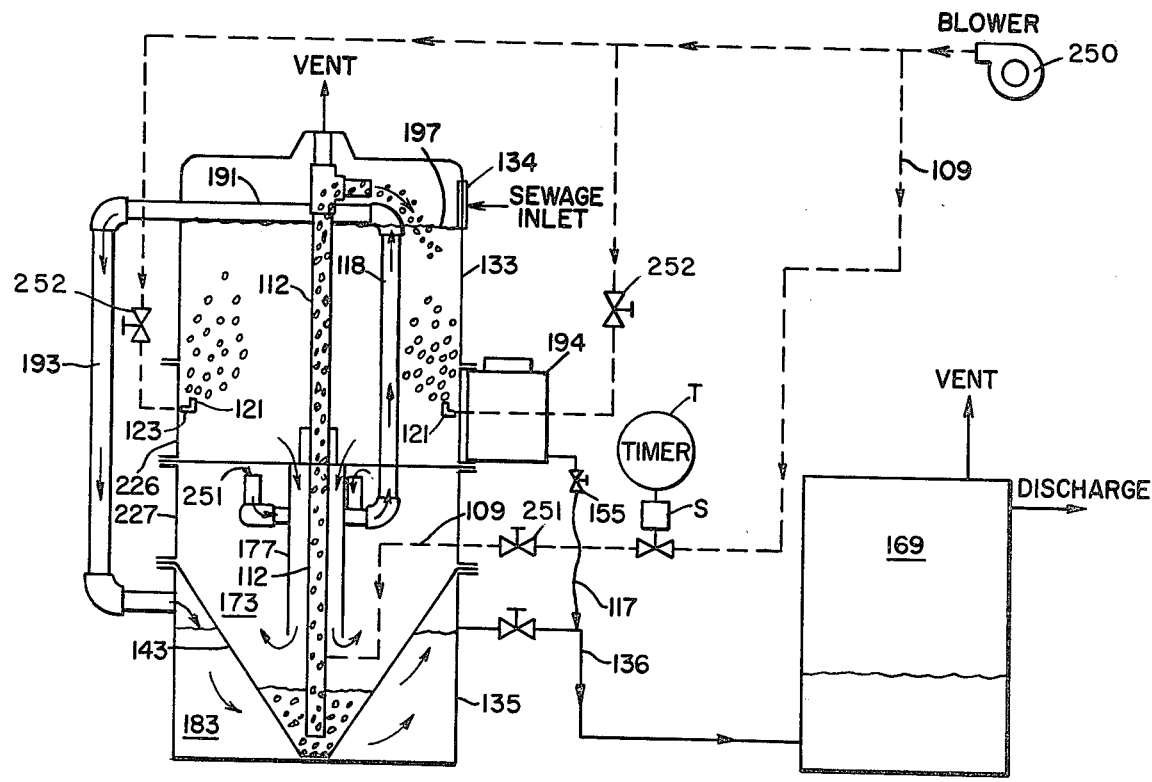
FIG. 14 is a schematic view of the embodiment of the invention shown in FIGS. 9 through 13.

As best seen in FIG. 14 periodic operation of the sludge return line is controlled by an adjustable timer T that will energize a solenoid valve S. When the solenoid valve is energized it will open and admit air into tube 109. A needle valve (not shown) is installed in the air supply line in tube 109 to enable adjustment of the sludge return flow rate. The periodic operation of the sludge return line will minimize hydraulic agitation of the liquid in the clarifier that causes sludge to remain in suspension instead of settling. Normal programmed operation of the solenoid valve would be one minute per hour. However, the frequency of operation can be varied or changed in the daily average sewage flow for each sewage treatment unit installation application. It will be noted from FIGS. 11 and 12 that crossover piping 191 curves or bends around the top of the aerator in order to get around the sludge return line 112 from standpipe 118 to downcomer 193 diametrically opposite thereform.

Aeration

Figure 12:
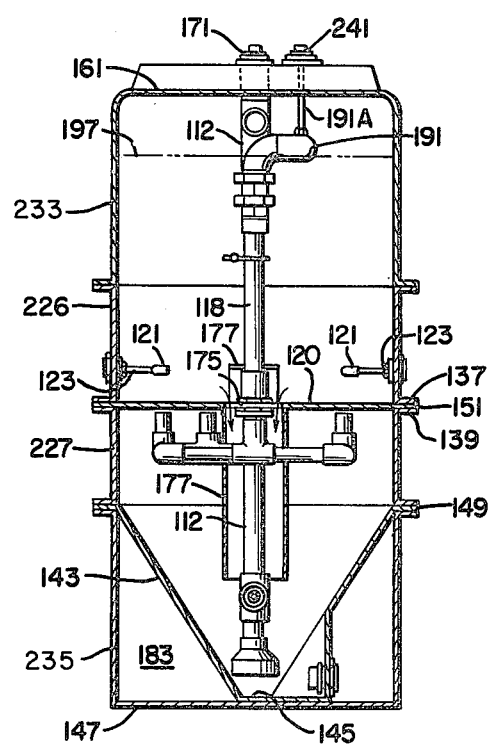
FIG. 12 is a top plan view of FIG. 11.
Figure 13:
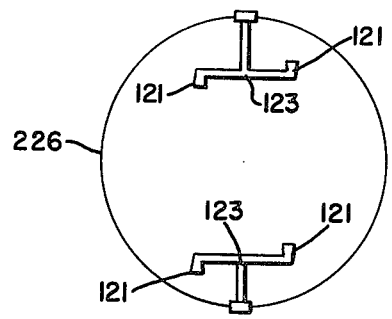
FIG. 13 is a horizontal sectional view taken on the line 13—13 in FIG. 10.

Air under a slight pressure of e.g. 3 to 5 psi, i.e., sufficient to overcome the liquid head of the treater and operate the airlift of the sludge return line, is admitted to the aeration chamber through four nozzles 121 (FIG. 13) located near the bottom of the aerator and close to the outer periphery thereof. The nozzles are connected to air inlet pipes 123 which pass through ports in the side of vessel 226, the pipes being sealed to the vessel by bulkhead seals. As shown in FIG. 12 the nozzles 121 are 45 degrees apart about the cylinder axis of the aeration chamber. However, fewer or additional nozzles may be employed. Preferably there are employed a plurality of nozzles equally spaced apart about the aerator axis.

The nozzles are disposed with their exit axes directed tangentially, i.e., perpendicular to radii drawn from the axis of the aerator to the nozzles. With this disposition, the air leaving the nozzles is in the form of horizontal tangential jets which cause the material in the aerator to travel in a circular path about the aerator axis.

The initial horizontal tangential flow of air from the jets will allow more contact time for oxygen transfer between the air and liquid in the aeration chamber and keep the settleable solids in suspension.

Disinfection

The chlorine contact discharge sump 169 is connected to the clarifier discharge chamber by a pipe 136. The liquid flowing from the clarifier discharge chamber through this interconnecting pipe 136 is disinfected by sodium hypochlorite (bleach) or other disinfectant in tank 194. The disinfectant flows by gravity through plastic tubes 117 into the interconnecting pipe 136. The gravity flow of the disinfectant is controlled by an adjustable needle valve 155.

The drain line for the clarifier discharges into the chlorine contact discharge sump through the interconnecting piping 136 between the clarifier discharge chamber and chlorine contact discharge sump. A separate shut off valve is installed in the discharge connection for the clarifier drain and clarifier discharge chamber. The chlorine contact discharge sump provides contact time for disinfection.

Whenever the liquid level in chlorinator 183 rises to the level of outlet port 185, liquid will flow out to a holding tank (not shown) or to another place of disposal. The holding tank (or chlorinator 183 itself) may be continuously or periodically pumped out.

During the period liquid suspension from the aerator is at rest in the clarifier, solids may settle out in the bottom of the clarifier as a sludge. The solids are guided to the center of the bottom of the clarifier by the sloping conical sides of the clarifier. The sludge is continuously or intermittently removed from the bottom of the clarifier by sludge return line 112. The sludge is discharged into the top of the aerator 159 near the point where fresh sewage enters; by this arrangement incoming sewage is mixed with bacteria-rich sludge to insure immediate commencement of the digestion process when air is added to the sewage in the aerator.

As best seen in FIG. 12, crossover pipe 191 is provided with an anti-siphon vent 241 venting the high side of piping 191 to atmosphere externally of the aeration chamber 159 by vent pipe 191A. For a further description of this function see U.S. Pat. No. 4,253,957, granted Mar. 3, 1981, entitled "MARINE SEWAGE DISPOSAL".

The treater is intended especially for use on board ship. Should the ship roll or pitch and incline the cylinder axis of the treater relative to the vertical, fluid in the aerator will rise relative to one side of the aerator. Should the direction of the inclination or a component thereof be toward standpipe 118, liquid will rise in standpipe 118. However, such rise will not itself cause additional flow of fluid from the aerator to the clarifier, for at the same time the top of downcomer 193 will be elevated. Downcomer 193 being diametrically opposite from standpipe 112, downcomer 193 will always go up when standpipe 118 goes down. Therefore, inclination of the treater axis to the vertical will not cause the aerator to be prematurely discharged, i.e. discharged before the level of the fluid therein, when the treater is uninclined, is below the bottom of crossover piping 191.

As liquid flows out of the clarifier via standpipe 118, additional fluid enters the clarifier via port 175. Guide 177 serves also as a baffle, preventing dense solids at the bottom of the aerator from leaving the aerator. Such solids will ultimately be reduced by macerating action of the air jets in the annulus formed between guide 177 and vessel 233 and then digested as they swirl around in the aerator at a level above such maceration annulus in the upper or digestion portion of the aerator, ultimately to leave as fine solids in suspension via the core portion of the aerator around the axis thereof above port 175. Such suspension falling from the core of the aerator through port 175 will enter the clarifier through skirt 177, which also forms a conduit. The suspension flows down the inside of such conduit or skirt to the lower part of the clarifier near but somewhat above the lower end of sludge return line 112. The skirt or conduit 177 thus keeps the suspension entering from the aerator out of contact with the relatively quiescent contents of the clarifier outside skirt 177 above the lower end of the skirt. This permits continuous fallout of solids from the upper part of the clarifier to the lower part thereof, the velocity of the liquid being lower in such upper part of the clarifier than inside of skirt 177. In addition, material in the liquid with a specific gravity less than 1 will float back up through conduit or skirt 177 and eventually be displaced back into the aerator 159.

It will then be seen that the centrifugal separation in the aerator is supplemented by the gravity separation in the clarifier.

Schematic of Embodiment of FIGS. 9 through 13

Referring now to FIG. 14, the flow path of the liquid as it is being treated is shown and the various components of the treatment system are shown.

Sewage flows by gravity into the sewage treatment unit aeration chamber 159 through a 3 inch inlet opening 134. The sewage discharged into the aeration chamber mixes with the water and bacterial sludge in the aeration chamber.

The normal liquid level 197 in the aeration chamber 159 remains constant. Liquid flows through the sewage treatment unit by means of gravity displacement. This means that as sewage flows into the aeration chamber an equal volume of treated liquid will flow by gravity into the chlorine contact discharge sump 169.

The air jet diffusers 121 blow air bubbles through the liquid in the aeration chamber to provide the oxygen to the bacteria need to keep the right kind of bacteria active and also to keep the sludge and sewage mixed up together as much as possible so the sewage will be consumed by the bacteria faster. The mixing caused by the air bubbles also help break up solid sewage entering the aeration chamber and keeps sludge and solids from settling on the bottom of the aeration chamber. The diffuser jet air flow is controlled by the needle valves 252.

Sewage flowing into the aeration chamber will force an equal volume of liquid to flow out of the clarifier 173. As the liquid flows from the aeration chamber through the clarifier, the bacteria sludge and other solids will separate from the water and drop down to the bottom of the clarifier cone 143. The accumulated sludge is recycled back into the aeration chamber 159 by the sludge return line 112.

Some of the air from the sewage treatment unit blower 250 is discharged into the base of the sludge return line. The air discharged into the sludge return line rises to the top. As this happens some of the liquid in the sludge return line is also forced up to the top of the pipe and out the discharge opening in the sludge return line. The sludge return line is an air lift pump that pumps settled sludge and water from the bottom of the clarifier cone back into the aeration chamber. The sludge return line flow rate is controlled by the needle valve 251, and a solenoid valve S for intermittent operation. This arrangement allows more settling time for the sludge.

The liquid displaced from the aeration chamber flows into the clarifier through the 6 inch circular clarifier baffle pipe 177. This baffle pipe keeps the sludge in the liquid flowing into the clarifier separate from the clear water being discharged from the clarifier. In addition, any floating material will separate from the liquid flowing into the clarifier and float back up into the aeration chamber 159, because this material will be lighter than the liquid slowly flowing through the circular clarifier baffle pipe.

The clear liquid in the top of the clarifier is discharged from the clarifier through the crossover manifold 118. The clear liquid flows into the crossover manifold through openings in the top of the pipe. The liquid then flows up through the pipe in the aeration chamber, and down into the clarifier discharge chamber 183 through the external crossover manifold pipe 193.

The elevated loop in the crossover manifold pipe provides a static liquid seal that keeps the liquid level in the aeration chamber 159 high enough so that there will be no air space in the top of the clarifier 173, that would allow the liquid in the clarifier to slosh up and down with rolling and pitching of the vessel. This sloshing would keep the sludge mixed up in the clarifier, and it would not settle out.

The clarifier discharge chamber provides additional retention time for oxidizing any sludge particles that may be discharged from the clarifier.

The water displaced from the clarifier discharge chamber flows by gravity through a 2 inch PVC valve and discharge line 136 into the chlorine contact discharge sump 169.

A liquid chlorine disinfectant chemical (bleach) flows by gravity into the liquid as it flows out of the clarifier discharge chamber.

The bleach is stored in a 5 gallon chlorine chemical solution tank 194 mounted on the side of the unit. The bleach flow rate is controlled by a PVC needle valve 155. The bleach is discharged by gravity into the discharge line through plastic tubing.

The chlorine contact discharge sump serves two requirements. First the volume of the sump is large enough so that the retention time of the liquid prior to discharge will be long enough to let the chlorine chemicals contact and kill the bacteria. Secondly, since most installations will require a discharge pump, the sump provides the working volume for controlling pump operation.

What we claim:

1. A sewage treatment device arranged in
   a vertical stack of cylindrical components comprising uppermost an aeration chamber,
   a clarification chamber beneath said aeration chamber in communication therewith,
   a clarifier discharge chamber beneath said aeration and clarification chambers,
   a chlorine contact discharge chamber connected to said clarifier discharge chamber, means communicating said clarification chamber with said clarifier discharge chamber, and anti-siphon vent means in said means communicating said clarification chamber with said clarifier discharge chamber and lying substantially in the geometric center of said aeration chamber.

2. A sewage treatment device as claimed in claim 1 further comprising a sludge return line communicating with the bottom of the clarification chamber and with the upper portion of said aeration chamber and further comprises a sludge return air supply line connected to said sludge return line and having means for pulsing said return air supply line.

3. A sewage treatment device as claimed in claim 2 wherein the means for pulsing said air supply is a timer actuated solenoid in the air supply line.

4. A sewage treatment device as claimed in claim 1 further comprising a plurality of air jet diffusers disposed circumferentially and spaced horizontally above the bottom of said aeration chamber.

5. A sewage treatment device as claimed in claim 1 wherein said clarification chamber is of conical configuration concentric with said aeration chamber, a flat disc having an opening therethrough forming a common wall between said aeration chamber and said clarification chamber, a cylindrical skirt passing through the opening in said disc forming conduit means to conduct fluid from said opening to near the bottom of said clarifier chamber to provide a quiescent zone in the clarifier outside of said skirt.

6. A sewage treatment device according to claim 1 further comprising a disinfector chamber vessel having a flat bottom and being of circular cross-section within which said clarification chamber is nested coaxially, and said clarification chamber having a flat bottom which rests on the flat bottom of said disinfector chamber vessel.

7. A sewage treatment device as claimed in claim 6 wherein said aeration chamber having the shape of an inverted mug with an outturned flange at the lip of the mug, said disinfector chamber having the shape of an upright mug of the same size and shape as the aerator vessel with a like outturned flange at the lip of the upright mug, said clarifier having the shape of a truncated conical cup with an outturned flange at the lip of the cup, said common wall being in the shape of a flat disc having a flat outer periphery forming a flange, said flanges of the disc and cup being captured between said flanges of said aerator and disinfector, said flanges being secured together by bolt means passing through a plurality of circumferentially spaced holes in the flange of said aerator and registering holes in the other three flanges.

8. A sewage treater comprising an aerator, a clarifier and a disinfector, said clarifier being disposed beneath said aerator and the top of the clarifier with a common wall therebetween forming the bottom of the aerator, first passage means to conduct fluid from the aerator to the clarifier, said first passage means comprising a central port in said common wall, and second passage means to conduct fluid from the clarifier to disinfector, said aerator having an influent inlet, said disinfector having an effluent outlet, said treater being distinguished in that said aerator includes a vessel and nozzle means for admitting air to the vessel in a direction to cause fluid in the vessel to move orbitally about a vertical axis, said nozzle means being disposed at a level proximate the common wall between said aerator and clarifier, and anti-siphon vent means in said second passage means and lying substantially in the geometric center of said aeration chamber.

* * * * *